United States Patent
Leslie et al.

(10) Patent No.: US 10,436,054 B2
(45) Date of Patent: Oct. 8, 2019

(54) BLADE OUTER AIR SEAL FOR A GAS TURBINE ENGINE

(71) Applicants: UNITED TECHNOLOGIES CORPORATION, Farmington, CT (US); MTU AERO ENGINES AG, Munich (DE)

(72) Inventors: Nicholas R. Leslie, South Berwick, ME (US); Fadi S. Maalouf, East Hampton, CT (US); Georg Zotz, Haimhausen (DE); Werner Humhauser, Moosburg (DE)

(73) Assignees: United Technologies Corporation, Farmington, CT (US); MTU Aero Engines AG, Munich (DE)

( * ) Notice: Subject to any disclaimer, the term of this patent is extended or adjusted under 35 U.S.C. 154(b) by 284 days.

(21) Appl. No.: 15/444,971

(22) Filed: Feb. 28, 2017

(65) Prior Publication Data
US 2017/0306784 A1    Oct. 26, 2017

Related U.S. Application Data

(63) Continuation of application No. 13/559,901, filed on Jul. 27, 2012, now Pat. No. 9,617,866.

(51) Int. Cl.
*F01D 11/12* (2006.01)

(52) U.S. Cl.
CPC .......... *F01D 11/122* (2013.01); *F01D 11/125* (2013.01); *F01D 11/127* (2013.01); *F05D 2230/312* (2013.01); *Y02T 50/6765* (2018.05)

(58) Field of Classification Search
CPC ...... F01D 11/08; F01D 11/122; F01D 11/125; F01D 11/127; F01D 25/246; F05D 2230/312
See application file for complete search history.

(56) References Cited

U.S. PATENT DOCUMENTS

| | | | | |
|---|---|---|---|---|
| 4,269,903 A | * | 5/1981 | Clingman | ................. C23C 4/18 428/591 |
| 4,497,610 A | | 2/1985 | Richardson et al. | |

(Continued)

FOREIGN PATENT DOCUMENTS

| | | |
|---|---|---|
| EP | 1965032 A2 | 9/2008 |
| GB | 2169037 A | 7/1986 |

OTHER PUBLICATIONS

International Search Report and Written Opinion of the International Searching Authority for International application No. PCT/US2013/050588 dated May 9, 2014.

(Continued)

*Primary Examiner* — David E Sosnowski
*Assistant Examiner* — Brian P Wolcott
(74) *Attorney, Agent, or Firm* — Carlson, Gaskey & Olds, P.C.

(57) ABSTRACT

A blade outer air seal (BOAS) for a gas turbine engine includes, among other things, a seal body having a radially inner face and a radially outer face that axially extend between a leading edge portion and a trailing edge portion. The BOAS includes a trough disposed on the radially inner face and an abradable seal received within the trough. The trough is open to expose a leading edge of the abradable seal to a core flow path of the gas turbine engine.

20 Claims, 3 Drawing Sheets

(56) References Cited

U.S. PATENT DOCUMENTS

| | | | | |
|---|---|---|---|---|
| 5,474,417 | A | * | 12/1995 | Privett .................. F04D 29/526 415/173.1 |
| 5,486,090 | A | | 1/1996 | Thompson et al. |
| 5,645,399 | A | * | 7/1997 | Angus ..................... F01D 11/18 415/177 |
| 5,791,871 | A | | 8/1998 | Sech et al. |
| 7,144,220 | B2 | | 12/2006 | Marcin, Jr. |
| 7,553,128 | B2 | | 6/2009 | Abdel-Messh et al. |
| 7,721,433 | B2 | | 5/2010 | Thompson et al. |
| 7,988,410 | B1 | | 8/2011 | Liang |
| 8,061,979 | B1 | | 11/2011 | Liang |
| 8,118,547 | B1 | | 2/2012 | Liang |
| 8,123,466 | B2 | | 2/2012 | Pietraszkiewicz et al. |
| 2006/0216146 | A1 | | 9/2006 | Thompson et al. |
| 2008/0211192 | A1 | | 9/2008 | Pietraszkiewicz et al. |
| 2009/0169368 | A1 | * | 7/2009 | Schlichting ........... F01D 11/122 415/173.1 |
| 2009/0214329 | A1 | | 8/2009 | Joe et al. |
| 2010/0050408 | A1 | | 3/2010 | Minor et al. |
| 2010/0310353 | A1 | | 12/2010 | Yu |
| 2011/0044803 | A1 | | 2/2011 | DiPaola et al. |
| 2011/0044804 | A1 | | 2/2011 | DiPaola et al. |
| 2011/0171011 | A1 | | 7/2011 | Lutjen et al. |

OTHER PUBLICATIONS

International Preliminary Report on Patentability for International application No. PCT/US2013/050588 dated Feb. 5, 2015.
Extended European Search Report for Application No. EP 13 84 5117 dated Jul. 6, 2016.

* cited by examiner

BLADE OUTER AIR SEAL FOR A GAS TURBINE ENGINE

CROSS REFERENCE TO RELATED APPLICATIONS

This is a continuation of U.S. patent application Ser. No. 13/559,901, which was filed on Jul. 27, 2012, the entire disclosure of which is incorporated herein by reference.

BACKGROUND

This disclosure relates to a gas turbine engine, and more particularly to a blade outer air seal (BOAS) that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

A casing of an engine static structure (which may be associated with either the compressor section or the turbine section) may include one or more blade outer air seals (BOAS) that provide an outer radial flow path boundary of the core flow path. One or more BOAS may be positioned in relative close proximity to a blade tip of each rotating blade in order to seal between the blades and the casing.

SUMMARY

A blade outer air seal (BOAS) for a gas turbine engine according to an exemplary aspect of the present disclosure includes, among other things, a seal body having a radially inner face and a radially outer face that axially extend between a leading edge portion and a trailing edge portion. The BOAS includes a trough disposed on the radially inner face and an abradable seal received within the trough. The trough is open to expose a leading edge of the abradable seal to a core flow path of the gas turbine engine.

In a further non-limiting embodiment of the foregoing BOAS, the BOAS may comprise a reverse retention hook that is disposed at one of the leading edge portion and the trailing edge portion.

In a further non-limiting embodiment of either of the foregoing BOAS, the reverse retention hook extends in a direction from the leading edge portion toward the trailing edge portion.

In a further non-limiting embodiment of any of the foregoing BOAS, the BOAS may comprise an axial retention feature and a radial retention feature disposed at one of the leading edge portion and the trailing edge portion.

In a further non-limiting embodiment of any of the foregoing BOAS, the radial retention feature extends from a vertical wall of the axial retention feature.

In a further non-limiting embodiment of any of the foregoing BOAS, the abradable seal is exposed at the leading edge and is axially constrained by the trough at a trailing edge of the abradable seal.

In a further non-limiting embodiment of any of the foregoing BOAS, the abradable seal is a plasma sprayed seal.

In a further non-limiting embodiment of any of the foregoing BOAS, the BOAS is a first stage high pressure compressor BOAS.

In a further non-limiting embodiment of any of the foregoing BOAS, the seal body is attached to a casing that includes at least a first surface and a second surface that is different from the first surface. Each of the first surface and the second surface include a thermal barrier coating.

In a further non-limiting embodiment of any of the foregoing BOAS, the thermal barrier coating of the first surface axially overlaps the thermal barrier coating of the second surface.

A gas turbine engine according to an exemplary aspect of the present disclosure includes, among other things, a casing and a blade outer air seal (BOAS) attached to the casing. A thermal barrier coating is applied to at least a first surface and a second surface of the casing that is different from the first surface. The thermal barrier coating on the first surface axially overlaps the thermal barrier coating on the second surface.

In a further non-limiting embodiment of the foregoing gas turbine engine, the first surface is radially outward from at least a portion of the second surface.

In a further non-limiting embodiment of either of the foregoing gas turbine engines, the BOAS includes a seal body having a radially inner face and a radially outer face that axially extends between a leading edge portion and a trailing edge portion.

In a further non-limiting embodiment of any of the foregoing gas turbine engines, the gas turbine engine comprises a reverse retention hook that extends in a direction from one of the leading edge portion and the trailing edge portion toward the other of the leading edge portion and the trailing edge portion.

In a further non-limiting embodiment of any of the foregoing gas turbine engines, a trough is disposed on the radially inner face and an abradable seal is received within the trough. The trough is open to expose a leading edge of the abradable seal to a core flow path of the gas turbine engine.

A gas turbine engine according to an exemplary aspect of the present disclosure includes, among other things, a compressor section, a combustor section in fluid communication with the compressor section along a core flow path and a turbine section in fluid communication with the combustor section along the core flow path. A blade outer air seal (BOAS) can be received relative to a casing associated with at least one of the compressor section and the turbine section. The BOAS includes a seal body having a radially inner face and a radially outer face that axially extend between a leading edge portion and a trailing edge portion, a trough disposed on the radially inner face, and an abradable seal received within the trough. The trough is open to expose a leading edge of the abradable seal to the core flow path.

In a further non-limiting embodiment of the foregoing gas turbine engine, a reverse retention hook extends in a direction from one of the leading edge portion and the trailing edge portion toward the other of the leading edge portion and the trailing edge portion.

In a further non-limiting embodiment of either of the foregoing gas turbine engines, the reverse retention hook is positioned at the leading edge portion and is received within a groove of the casing.

In a further non-limiting embodiment of any of the foregoing gas turbine engines, an axial retention feature and a radial retention feature are disposed at one of the leading edge portions and the trailing edge portion.

In a further non-limiting embodiment of any of the foregoing gas turbine engines, a thermal barrier coating is applied to at least a first surface and a second surface of the casing that is different from the first surface. The thermal barrier coating on the first surface axially overlaps the thermal barrier coating on the second surface.

The various features and advantages of this disclosure will become apparent to those skilled in the art from the following detailed description. The drawings that accompany the detailed description can be briefly described as follows.

DETAILED DESCRIPTION

Figure 1:
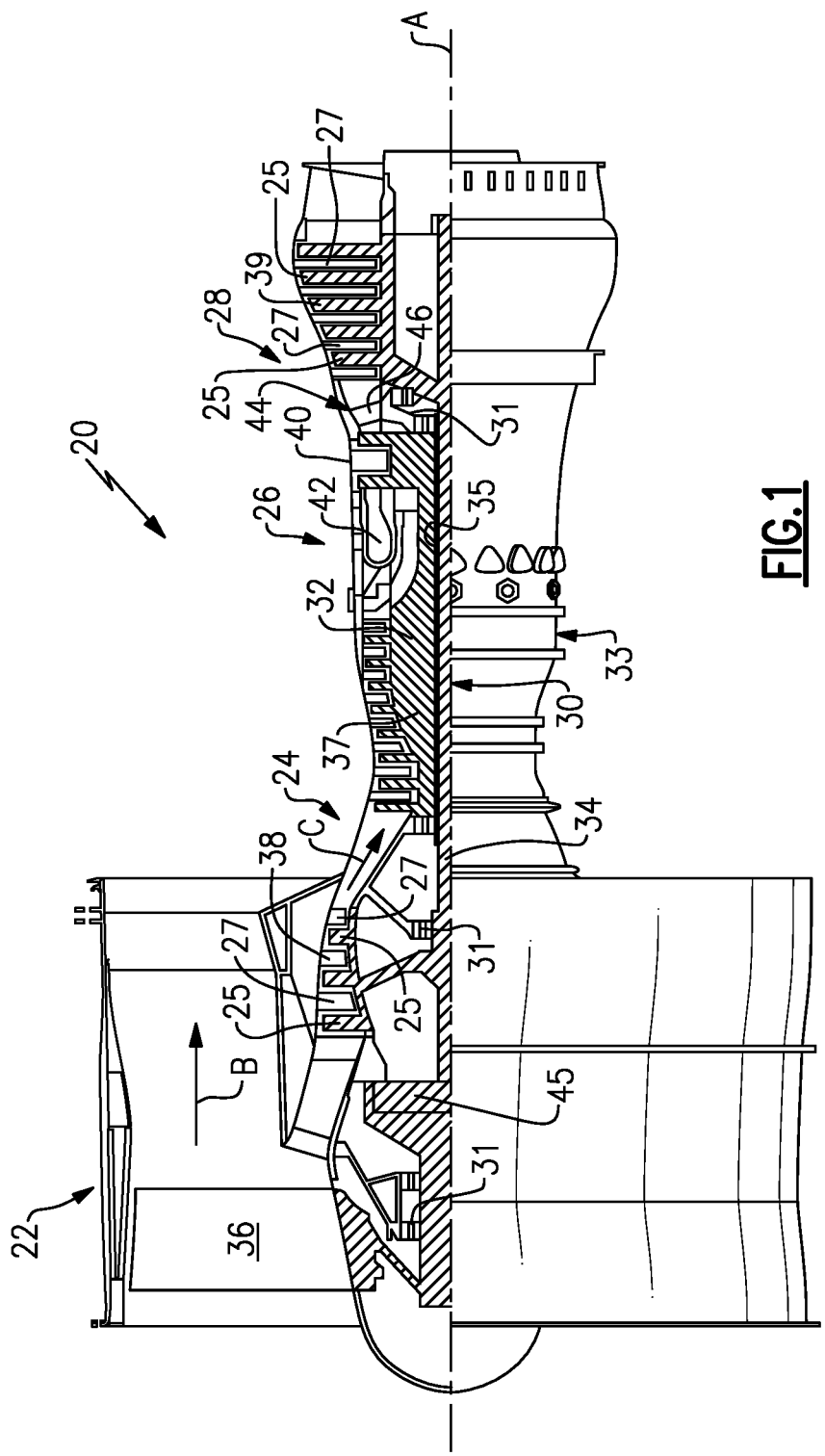
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 supports one or more bearing systems 31 of the turbine section 28. The mid-turbine frame 44 may include one or more airfoils 46 that may be positioned within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

In some non-limiting examples, the gas turbine engine 20 is a high-bypass geared aircraft engine. In a further example, the gas turbine engine 20 bypass ratio is greater than about six (6:1). The geared architecture 45 can include an epicyclic gear train, such as a planetary gear system or other gear system. The example epicyclic gear train has a gear reduction ratio of greater than about 2.3, and in another example is greater than about 2.5:1. The geared turbofan enables operation of the low speed spool 30 at higher speeds which can increase the operational efficiency of the low pressure compressor 38 and low pressure turbine 39 and render increased pressure in a fewer number of stages.

The low pressure turbine 39 pressure ratio is pressure measured prior to the inlet of the low pressure turbine 39 as related to the pressure at the outlet of the low pressure turbine 39 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about 5 (5:1). It should be understood, however, that the above parameters are only exemplary of one embodiment of a geared architecture engine and that the present disclosure is applicable to other gas turbine engines including direct drive turbofans.

In this embodiment of the example gas turbine engine 20, a significant amount of thrust is provided by a bypass flow B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of "T"/$518.7^{0.5}$. T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 of the rotor assemblies to either add or extract energy. As is discussed in greater detail below, blade outer air seals (BOAS) can be positioned in relative close proximity to a blade tip of each blade 25 in order to seal between the blades 25 and the engine static structure 33.

Figure 2:
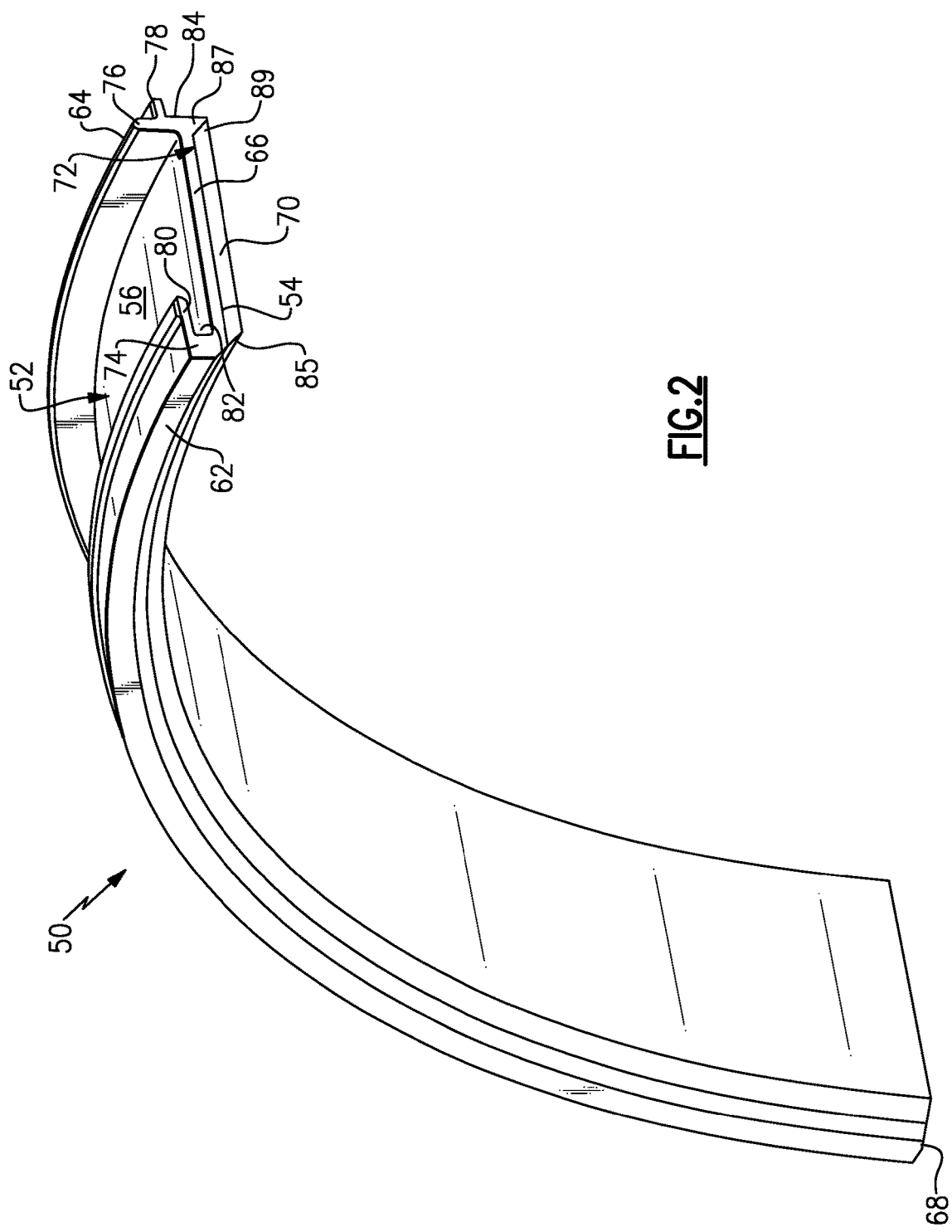
FIG. 2 illustrates a blade outer air seal (BOAS) that can be incorporated into a gas turbine engine.
Figure 3:
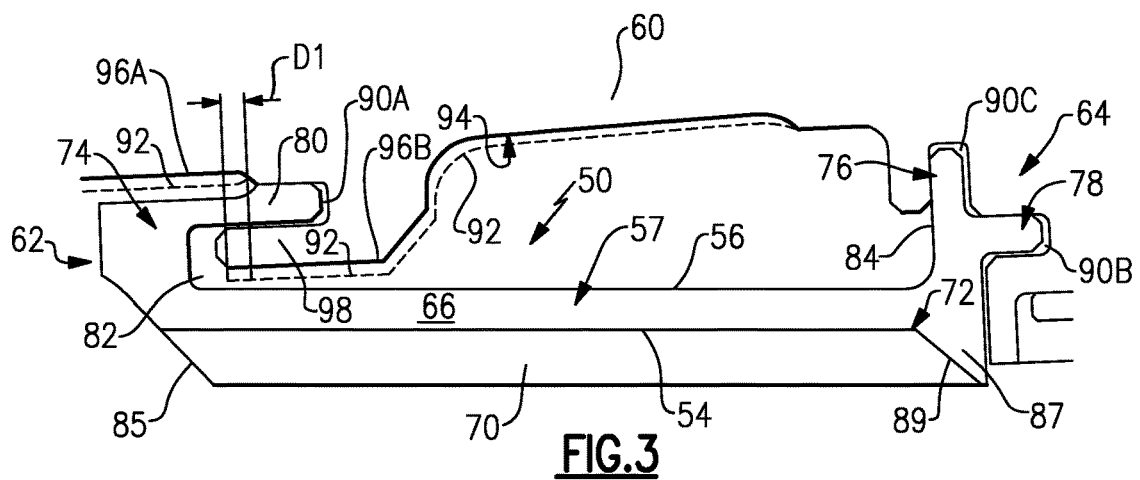
FIG. 3 illustrates a cross-sectional view of an exemplary BOAS.

FIGS. 2 and 3 illustrate one exemplary embodiment of a BOAS 50 that may be incorporated into a gas turbine engine, such as the gas turbine engine 20. The BOAS 50 of this exemplary embodiment is a segmented BOAS that can be positioned and assembled relative to a multitude of additional BOAS segments to form a full ring hoop assembly that circumscribes the rotating blades 25 of either the compressor section 24 or the turbine section 28 of the gas turbine engine 20. The BOAS 50 can be circumferentially disposed about the engine centerline longitudinal axis A (see FIG. 4). It should be understood that the BOAS 50 could embody other designs and configurations within the scope of this disclosure.

The BOAS 50 includes a seal body 52 having a radially inner face 54 and a radially outer face 56. The seal body 52 axially extends between a leading edge portion 62 and a trailing edge portion 64, and circumferentially extends between a first mate face 66 and a second mate face 68. The BOAS 50 may be constructed from any suitable material, including but not limited to, high temperature metallic alloys or other materials.

An abradable seal 70 can be secured within a trough 72 of the radially inner face 54 of the seal body 52. In this embodiment, the trough 72 is a cavity formed by the radially inner face 54. The abradable seal 70 may be plasma sprayed or could be applied using other techniques. The abradable seal 70 interacts with a blade tip 58 of a blade 25 (see FIG. 4) to reduce airflow leakage around the blade tip 58.

The trough 72 can be open at the leading edge portion 62 such that the abradable seal 70 opens to the leading edge portion 62 of the BOAS 50. In other words, the abradable seal 70 is open at its leading edge 85 and is axially constrained by a radial wall 87 at its trailing edge 89. It should be understood that an opposite configuration is also contemplated in which the abradable seal 70 is open to the trailing edge portion 64 and is axially constrained at the leading edge portion 62.

In one exemplary embodiment, the leading edge portion 62 includes a reverse retention hook 74 and the trailing edge portion 64 includes both an axial retention feature 76 and a radial retention feature 78. It should be understood that an opposite configuration is also contemplated in which the reverse retention hook 74 is positioned at the trailing edge portion 64 and the axial retention feature 76 and the radial retention feature 78 are positioned at the leading edge portion 62. As discussed in greater detail below, the reverse retention hook 74, the axial retention feature 76, and the radial retention feature 78 are capable of axially and radially maintaining a position of the BOAS 50 within the gas turbine engine 20.

The reverse retention hook 74 can extend in a direction from the leading edge portion 62 toward the trailing edge portion 64. The reverse retention hook 74 includes a flange 80 that can extend substantially parallel to the radially outer face 56. A cavity 82 extends between the flange 80 and the radially outer face 56.

The axial retention feature 76 includes a vertical wall 84 that protrudes from the radially outer face 56. The radial retention feature 78 extends transversely relative to the vertical wall 84. In this exemplary embodiment, the radial retention feature 78 is perpendicular to the vertical wall 84 of the axial retention feature 76 and extends is a direction away from the reverse retention hook 74.

In the embodiment of FIG. 3, the BOAS 50 is attached to a casing 60 of the engine static structure 33. The casing 60 may be an outer engine casing of the gas turbine engine 20 and could be associated with either the compressor section 24 or the turbine section 28 of the gas turbine engine 20. The BOAS 50 is radially and axially retained relative to the casing 60 by the reverse retention hook 74, the axial retention feature 76 and the radial retention feature 78. The BOAS 50 may be loaded radially relative to the casing 60 (i.e., sprung-in radially).

In this exemplary embodiment, the leading edge portion 62 of the BOAS 50 is radially retained to the casing 60 by the reverse retention hook 74. The reverse retention hook 74 can be received within a first groove 90A of the casing 60 such that the flange 80 overlaps a flange 98 of the casing 60. The trailing edge portion 64 of the BOAS 50 can be radially retained to the casing 60 via the radial retention feature 78. The axial retention feature 76 maintains an axial positioning of the BOAS 50 relative to the casing 60. In one embodiment, the radial retention feature 78 is received within a second groove 90B of the casing 60 and the axial retention feature 76 is received within a third groove 90C of the casing 60. Other mounting configurations are contemplated as within the scope of this disclosure.

A thermal barrier coating (TBC) 92 can be applied to the casing 60. It should be understood that any suitable TBC 92 could be applied to any portion of the casing 60 and/or the BOAS 50. In one embodiment, the TBC 92 is applied to each of a first surface 96A and a second surface 96B of a radially inner portion 94 of the casing 60. The second surface 96B, which can include the flange 98 of the casing 60, is a different surface from the first surface 96A. In other words, the first surface 96A and the second surface 96B can be axially and radially displaced relative to one another. In this embodiment, the first surface 96A is at least partially axially upstream and radially outward from the second surface 96B. The TBC 92 applied to the first surface 96A axially overlaps the TBC 92 applied to the second surface 96B by a distance D1. The actual dimension of the distance D1 will vary depending upon the size and type of the gas turbine engine 20, among other factors.

Figure 4:
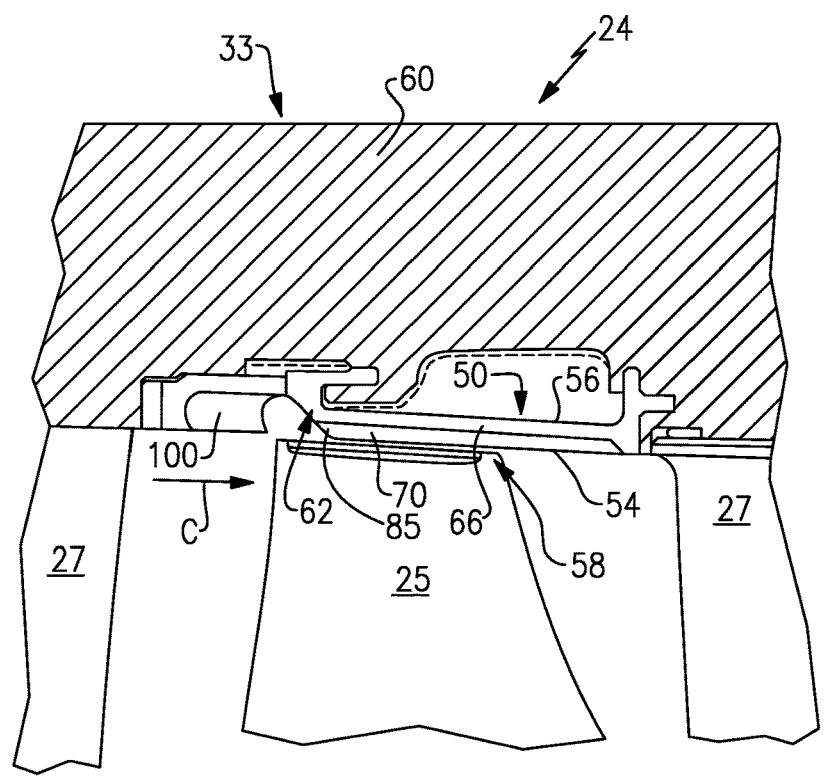
FIG. 4 illustrates a cross-sectional view of a portion of a gas turbine engine that can incorporate a BOAS.

FIG. 4 illustrates a cross-sectional view of a BOAS 50 mounted within the gas turbine engine 20. In this exemplary embodiment, the BOAS 50 is mounted within the compressor section 24 of the gas turbine engine 20. For example, the BOAS 50 could be a first stage high pressure compressor (HPC) BOAS. However, it should be understood that other portions of the gas turbine engine 20 could benefit from the teachings of this disclosure, including but not limited to, the turbine section 28.

In this exemplary embodiment, a blade 25 (only one shown, although multiple blades could be circumferentially disposed about a rotor disk (not shown) within the gas turbine engine 20) is mounted for rotation relative to the casing 60 of the engine static structure 33. In the compressor section 24, the blade 25 rotates to add energy to the hot combustion gases that are communicated through the gas turbine engine 20 along the core flow path C. Vanes 27 may also be supported within the casing 60 adjacent to the blade 25. The vanes 27 (additional vanes could be circumferentially disposed about the engine longitudinal centerline axis A as part of a vane assembly) prepare the core airflow for the blade(s) 25. Additional rows of vanes could also be disposed within the gas turbine engine 20.

The blade 25 includes a blade tip 58 at a radially outermost portion of the blade 25. The BOAS 50 establishes an outer radial flow path boundary of the core flow path C. The blade tip 58 and the abradable seal 70 of the BOAS 50 cooperate to limit airflow leakage around the blade tip 58. The radially inner face 54 of the BOAS 50 faces toward the blade tip 58 of the blade 25 (i.e., the radially inner face 54 is positioned on the core flow path C side) and the radially outer face 56 faces the casing 60 (i.e., the radially outer face 56 is positioned on a non-core flow path side).

The BOAS 50 is disposed in an annulus radially between the casing 60 and the blade tip 58. Although this particular embodiment is illustrated in cross-section, the BOAS 50 may be attached at its mate faces 66, 68 (See FIG. 2) to additional blade outer air seals to form a shroud that circumscribes associated blades 25 of the compressor section 24 and/or the turbine section 28. A casing treatment 100 can be positioned upstream from the BOAS 50. The casing treatment 100 interfaces with the leading edge portion 62 of the BOAS. Because the abradable seal 70 is open at its leading edge 85, the leading edge 85 of the abradable seal 70 is exposed to the core flow path C. The aerodynamic geometry provided by the exposed leading edge 85 of the abradable seal 70 of the BOAS 50 may increase the engine stability and improve the stall margins of the gas turbine engine 20.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

What is claimed is:

1. A blade outer air seal (BOAS) for a gas turbine engine, comprising:
   a monolithic seal body having a radially inner face and a radially outer face that axially extend between a leading edge portion and a trailing edge portion;
   a trough disposed on said radially inner face;
   an abradable seal received within said trough, wherein said trough is open to expose a leading edge of said abradable seal to a core flow path of the gas turbine engine and a trailing edge of said abradable seal is axially constrained by said trough; and
   wherein said seal body is attached to a casing that includes at least a first surface and a second surface that is different from said first surface, wherein each of said first surface and said second surface include a thermal barrier coating, and said thermal barrier coating of said first surface axially overlaps said thermal barrier coating of said second surface such that a portion of said first surface is axially and radially displaced from a portion of said second surface.

2. The BOAS as recited in claim 1, comprising a reverse retention hook that is disposed at one of said leading edge portion and said trailing edge portion, and said reverse retention hook extends in a direction from said leading edge portion toward said trailing edge portion.

3. The BOAS as recited in claim 1, wherein said abradable seal is axially constrained at said trailing edge by a radial wall of said trough.

4. The BOAS as recited in claim 1, comprising an axial retention feature and a radial retention feature disposed at one of said leading edge portion and said trailing edge portion.

5. The BOAS as recited in claim 4, wherein said radial retention feature extends from a vertical wall of said axial retention feature.

6. The BOAS as recited in claim 1, wherein said abradable seal is axially constrained at said trailing edge by a radial wall of said trough.

7. The BOAS as recited in claim 1, wherein said abradable seal is a plasma sprayed seal.

8. The BOAS as recited in claim 1, wherein said BOAS is a first stage high pressure compressor BOAS.

9. The BOAS as recited in claim 1, wherein said trough is a cavity formed by said radially inner face.

10. A gas turbine engine, comprising:
    a compressor section;
    a combustor section in fluid communication with said compressor section along a core flow path;
    a turbine section in fluid communication with said combustor section along said core flow path; and
    a blade outer air seal (BOAS) that can be received relative to a casing associated with at least one of said compressor section and said turbine section, wherein said BOAS includes:
      a seal body having a radially inner face and a radially outer face that axially extend between a leading edge portion and a trailing edge portion;
      a trough disposed on said radially inner face; and
      an abradable seal received within said trough, wherein said trough is open to expose a leading-most edge of said abradable seal to said core flow path; and
      a thermal barrier coating disposed on a first surface and a second surface of said casing, a portion of said first surface being axially and radially displaced from a portion of said second surface such that said thermal barrier coating of said first surface axially overlaps said thermal barrier coating of said second surface.

11. The gas turbine engine as recited in claim 10, comprising a reverse retention hook that extends in a direction from one of said leading edge portion and said trailing edge portion toward the other of said leading edge portion and said trailing edge portion.

12. The gas turbine engine as recited in claim 11, wherein said reverse retention hook is positioned at said leading edge portion and is received within a groove of said casing.

13. The gas turbine engine as recited in claim 10, comprising an axial retention feature and a radial retention feature disposed at one of said leading edge portion and said trailing edge portion.

14. The gas turbine engine as recited in claim 10, comprising a thermal barrier coating applied to at least a first surface and a second surface of said casing that is different from said first surface, wherein said thermal barrier coating on said first surface axially overlaps said thermal barrier coating on said second surface.

15. The gas turbine engine as recited in claim 10, wherein an entirety of said leading-most edge of said abradable seal is exposed to said core flow path.

16. The gas turbine engine as recited in claim 10, wherein said trough is a cavity formed by said radially inner face.

17. A blade outer air seal (BOAS) for a gas turbine engine, comprising:
   a seal body having a radially inner face and a radially outer face that axially extend between a leading edge portion and a trailing edge portion;
   a trough disposed on said radially inner face;
   a seal received within said trough, wherein said trough is open to expose a leading edge of said seal to a core flow path of the gas turbine engine and a trailing edge of said seal is axially constrained by said trough; and
   wherein said seal body is attached to a casing that includes at least a first surface and a second surface that is different from said first surface, wherein each of said first surface and said second surface include a thermal barrier coating, and said thermal barrier coating of said first surface axially overlaps said thermal barrier coating of said second surface such that a portion of said first surface is axially and radially displaced from a portion of said second surface.

18. The BOAS as recited in claim 17, wherein the leading edge portion includes a retention hook including an axially extending flange.

19. The BOAS as recited in claim 18, wherein the trailing edge portion includes an axial retention feature and a radial retention feature.

20. The BOAS as recited in claim 19, wherein the seal body is monolithic and the seal is abradable.

* * * * *